US010704938B2

(12) United States Patent
Valtierra et al.

(10) Patent No.: US 10,704,938 B2
(45) Date of Patent: Jul. 7, 2020

(54) PUMPJACK PRODUCTION WELL INCLUDING FLUID SENSOR HAVING 2-DIMENSIONAL VENTURI AND CAPACITIVE FLOW SENSOR (71) Applicant: Hydroacoustics Inc., Henrietta, NY (US)

(72) Inventors: Robert D. Valtierra, Barrington, RI (US); Ricardo P. Quintanilla, Rochester, NY (US); Frederick J. Cookhouse, Pittsford, NY (US)

(73) Assignee: Hydroacoustics, Inc., Henrietta, NY (US)

( * ) Notice: Subject to any disclaimer, the term of this patent is extended or adjusted under 35 U.S.C. 154(b) by 0 days.

(21) Appl. No.: 16/263,136

(22) Filed: Jan. 31, 2019

(65) Prior Publication Data
US 2019/0234777 A1    Aug. 1, 2019

Related U.S. Application Data (60) Provisional application No. 62/624,171, filed on Jan. 31, 2018, provisional application No. 62/627,310, filed on Feb. 7, 2018, provisional application No. 62/659,825, filed on Apr. 19, 2018.

(51) Int. Cl.
G01F 1/44        (2006.01)
F04B 47/02       (2006.01)
G01N 27/22       (2006.01)
F04B 49/06       (2006.01)
F04B 49/08       (2006.01)
F04B 51/00       (2006.01)

(52) U.S. Cl.
CPC ............... G01F 1/44 (2013.01); F04B 47/02 (2013.01); F04B 49/065 (2013.01); F04B 49/08 (2013.01); F04B 51/00 (2013.01); G01N 27/221 (2013.01); G01N 27/22 (2013.01)

(58) Field of Classification Search
None
See application file for complete search history.

(56) References Cited

U.S. PATENT DOCUMENTS

| 4,509,371 | A |   | 4/1985 | Wellman |
| 4,523,644 | A |   | 6/1985 | Dismukes |
| 5,672,832 | A | * | 9/1997 | Cucci ........................ G01F 1/44 73/861.52 |
| 6,755,086 | B2 |  | 6/2004 | Salamitou et al. |
| 8,113,278 | B2 |  | 2/2012 | DeLaCroix et al. |

(Continued)

FOREIGN PATENT DOCUMENTS

EP    2780858    3/2014

OTHER PUBLICATIONS

International Search Report With Written Opinion for PCT/US19/15960 dated May 23, 2019.

(Continued)

Primary Examiner — Harshad R Patel
(74) Attorney, Agent, or Firm — Duane C. Basch; Basch & Nickerson LLP (57) ABSTRACT A fluid sensor, and associated monitoring and control system, employing a 2-dimensional venturi to eliminate stratification of fluid passing therethrough, and a capacitive sensor operatively coupled with the 2-dimensional venturi to facilitate the sensing of the fluid while in the venturi.

14 Claims, 14 Drawing Sheets (56) References Cited

U.S. PATENT DOCUMENTS

| | | |
|---|---|---|
| 2004/0149436 A1 | 8/2004 | Sheldon |
| 2004/0182172 A1 | 9/2004 | Richards |
| 2006/0162466 A1 | 7/2006 | Wargo et al. |
| 2009/0065197 A1 | 3/2009 | Eslinger |
| 2009/0200019 A1 | 8/2009 | DeLaCroix et al. |
| 2010/0121257 A1 | 5/2010 | King |
| 2010/0290313 A1 | 11/2010 | Groves |
| 2011/0259120 A1* | 10/2011 | Thonstad ................ G01F 1/363 73/861.42 |
| 2014/0216727 A1 | 8/2014 | Kasyanov et al. |
| 2014/0305877 A1 | 10/2014 | Cioanta et al. |
| 2015/0075867 A1 | 3/2015 | Eddison et al. |
| 2016/0115753 A1 | 4/2016 | Frazier et al. |

OTHER PUBLICATIONS

International Search Report With Written Opinion for PCT/US19/17014 dated May 1, 2019.

* cited by examiner

PUMPJACK PRODUCTION WELL INCLUDING FLUID SENSOR HAVING 2-DIMENSIONAL VENTURI AND CAPACITIVE FLOW SENSOR

This application claims priority under 35 U.S.C. § 119(e) to the following provisional patent applications by Applicant Hydroacoustics, Inc.: U.S. Provisional Application No. 62/624,171 for a FLUID SENSOR AND PUMPJACK CONTROL SYSTEM by R. Valtierra et al., filed Jan. 31, 2018; U.S. Provisional Application No. 62/627,310 for an OIL RECOVERY TOOL by R. Valtierra et al., filed Feb. 7, 2018; and U.S. Provisional Application No. 62/659,825 for an OIL RECOVERY TOOL by R. Valtierra, filed Apr. 19, 2018, all of which are hereby incorporated by reference in their entirety.

Disclosed is a device that employs a combination 2-dimensional venturi and a capacitive sensor to provide accurate characterization of both the flow rate of fluid (pressure differential) through the sensor along with the dielectric strength of the fluid to enable a characterization of the fluid as water or oil (or mixture thereof, or gas).

BACKGROUND AND SUMMARY

Conventional fluid flow sensors often are used to sense the flow of a liquid. However, such sensors are generally designed to operate with a particular type of fluid, and are not always suitable for monitoring the flow of unknown fluids or mixtures (e.g., oil and water). Conventional sensors are intended for relatively steady state operation and may not be suitable for the dynamic flow produced by a pumpjack, where the flow comes in surges. One aspect of the venturi design was intentionally avoiding issues associated with sensors that rely on a spinning wheel or rotor to detect flow, while avoiding the cost of acoustic or magnetic sensors. Moreover, capacitive sensors are known to monitor the dielectric strength of the material between the sensors, thereby allowing for the characterization of the flowing fluid.

While fluid sensor technology may be known, there remains a need for a sensor suitable for detecting both a fluid flow rate and the dielectric strength of the flowing fluid. The dielectric strength can be employed to characterize the type of fluid, so that in combination it may be possible to determine the flow rates of different fluids that may pass through the sensor.

In one application contemplated for the disclosed embodiments, the fluid sensor may be used in a pumpjack production well, where oil, water and gas are present and may be extracted. The sensor is potentially able to detect each of three possible phases of the well's production, and to totalize the amount of water and oil produced from the well. And, the specific combination of components disclosed herein also allows for compaction and miniaturization, where an existing well may lack space for a long compound assembly to sense fluid flow and pressure.

Disclosed in embodiments herein is a fluid sensor comprising: a 2-dimensional venturi producing a controlled thickness of non-stratified fluid flow therethrough; a first fluid pressure sensor located on an inlet to the venturi; a second fluid pressure sensor located on an outlet of the venturi; a capacitive sensor located adjacent the 2-dimensional venturi, the capacitive sensor including a pair of parallel conductive metal plates located on each side of the 2-dimensional venturi.

Further disclosed in embodiments herein is a pumpjack monitoring and control system, including: an in-line fluid sensor, operatively coupled to receive the fluid output of a pumpjack connected to a wellhead, and to generate pressure and capacitance signals in response to the fluid output, said fluid sensor comprising, a) a first fluid pressure sensor located on an inlet to the venturi; b) a second fluid pressure sensor located on an outlet of the venturi; c) a capacitive sensor located adjacent the 2-dimensional venturi, the capacitive sensor including a pair of parallel conductive metal plates located on each side of the 2-dimensional venturi; and a controller, operating in accordance with a set of pre-programmed instructions, said controller receiving output from said fluid sensor, said controller processing the output and using said output to monitor the pumpjack output and to report the performance of the pumpjack, and to totalize the amount of oil and/or water pumped from the wellhead.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Referring to FIGS. 1-4, depicted therein are various views of a fluid sensor 110. In the illustrated example, fluid sensor 110 includes a 2-dimensional venturi 120, where the venturi causes pressurized fluid(s) pumped therethrough to take the form of a controlled thickness of non-stratified fluid as the fluid flows. The 2-dimensional venturi 120 reduces or eliminates stratification of the fluid flowing therethrough as a result of the combination of the 2-dimensional venturi region and the "necking" down of the incoming cylindrical fluid passage 122 into a thin, planar region 124. Venturi 120 also includes a first fluid pressure sensor 130 located on inlet 132 to the venturi to measure a pressure for the pumped input fluid. A second fluid pressure sensor 140 is located on the outlet side 142 of the venturi 120 to measure a pressure of the output fluid. It will be noted that one or both sensors 130 and 140 may also be suitable for sensing the temperature of the fluid passing thereby in order to provide fluid temperature data as well as pressure data.

In one embodiment, venturi 120 may be 3D printed from stereolithography-compatible resin or similar non-magnetic material. It is also contemplated that the venturi may be injection-molded or machined using other well-known techniques. For durability, the venturi or other sensor components may be incorporated into a metal pipe (e.g., FIG. 1) and potted using a durable epoxy resin. The pressure sensors 130 and 140 are sensors that may be obtained from TE Connectivity company, for example Part No. MS5803-05BA. While a fluid sensor 110 made with polymeric components such as polyvinyl chloride (PVC), etc.) may be suitable for relatively limited (low) pressures in ranges of up to 50 psi or even 70 psi, it will be appreciated that the fluid sensor may also be designed for use in higher-pressure applications exceeding 70 psi. For example, with alternative materials and seals (e.g., thicker-walled steel or stainless steel components, high-pressure gaskets and seals, etc.), the disclosed sensor may be employed on pressurized wells and the like. In such an embodiment, use of a differential pressure probe(s) is contemplated to handle the increased range of pressures that the venturi sensor may experience.

Another aspect of the 2-dimensional venturi 120 is that it provides large planar regions 124 on either side thereof to which a capacitive sensor 160 is attached adjacent the venturi. More specifically, the capacitive sensor includes a pair of parallel conductive metal plates 164 (e.g., made of copper, brass, etc., and of approximately 5 sq. in. and 0.01 in. thickness) located on each side of the 2-dimensional venturi. In one embodiment copper plates are employed as it is easy to cut them to the appropriate size, and a conventional solder may be employed to attach electrical wire leads to the sensor plates 164. A capacitance measured between the plates 164 is output as a dielectric strength of the fluid flowing through the venturi, where the capacitance allows for the characterization of the fluid—and in particular the ability to distinguish between the presence of water versus oil flowing through the sensor by the relative difference in dielectric strength.

Using the pressure differential measures as a difference between the outputs of the first pressure sensor 130 and the second pressure sensor 140, it is possible to determine a fluid flow rate as a result of both the size of the 2-dimensional venturi and/or calibration of the venturi itself. Accordingly, the fluid sensor 110 allows the device to determine a fluid flow rate as a function of the input fluid pressure from sensor 130 and output fluid pressure from sensor 140.

Figure 1:
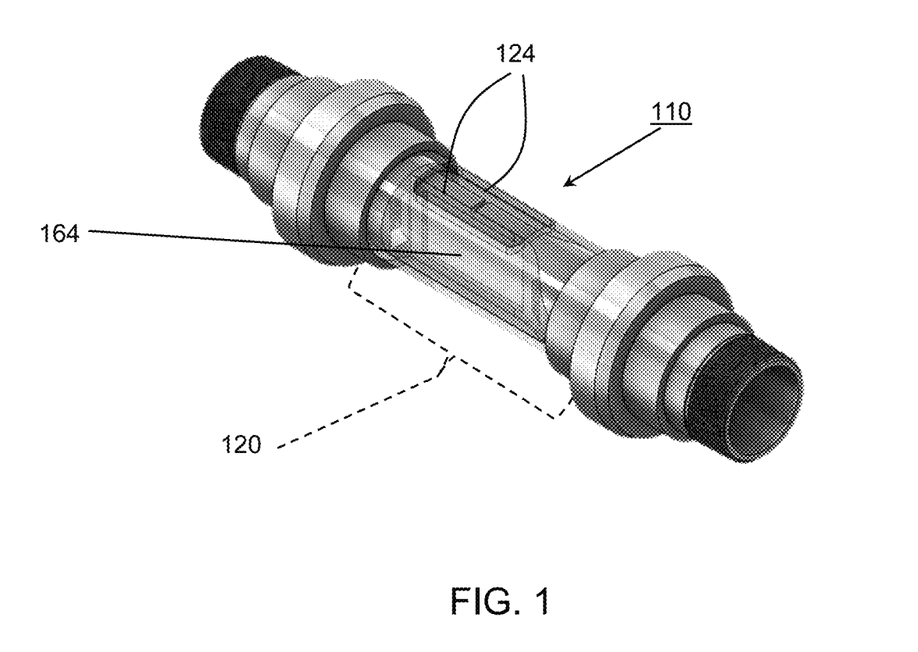
FIG. 1 is a perspective view of an embodiment of the fluid sensor incorporated within a plumbing fixture.
Figure 4:
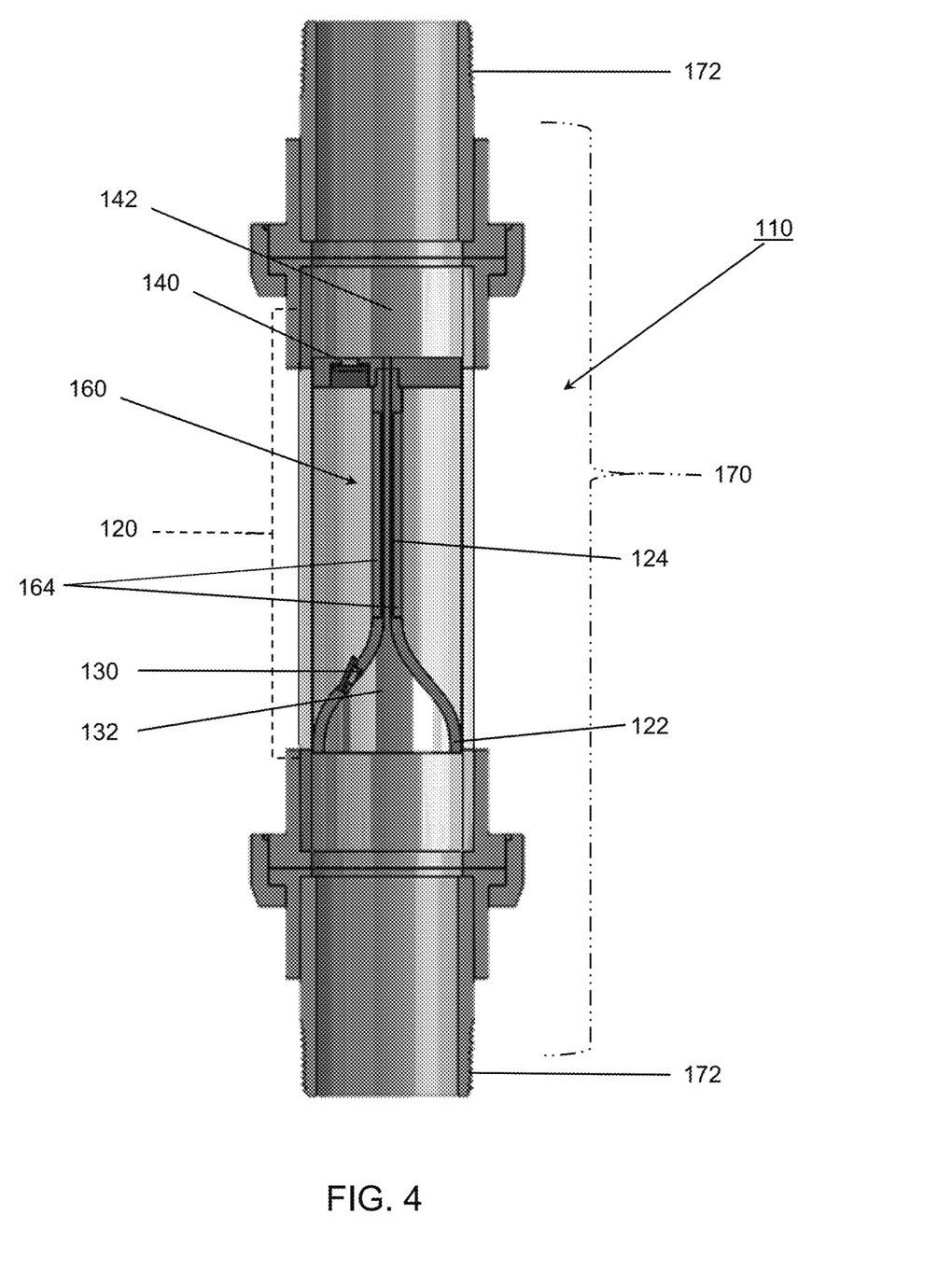
FIG. 4 is a top cross-sectional view of the embodiment of FIG. 1.
Figure 5:
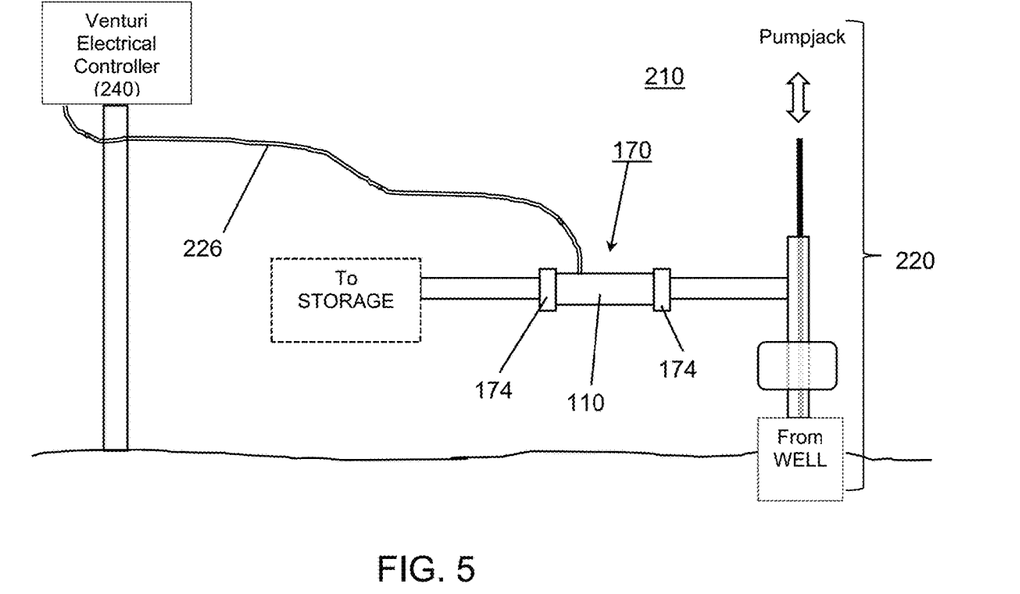
FIGS. 5-6 are, respectively, illustrative examples of a method of installing a venturi sensor and monitoring and control circuitry for incorporating the sensor into a pumpjack well system.

In one embodiment, such as that depicted in FIGS. 1 and 4, the sensor 110 is contained within a housing 170, which is outfitted with standard threaded nipples 172 or similar couplings 174 on either end thereof in order to provide the sensor as a complete unit suitable for being plumbed or retrofitted in-line into a pumpjack well piping system such as depicted in FIG. 5. Moreover, as a result of the depicted design, the venturi 120 and sensor 110 are completely self-draining after the pumpjack is shut down, thereby avoiding fluid (e.g., water) collection and potential damage to the sensor due to freezing conditions, etc. As previously suggested, the use of a 2-dimensional venturi design, in combination with the necking-down of the cylindrical pipe cross-section to a linear slit at the entrance to the venturi (see e.g., end view of planar region 124 in FIG. 3), avoids fluid stratification. Another characteristic of the disclosed sensor embodiment is the maximization of the capacitive plate surface area while maintaining a compact sensor assembly.

Figure 6:
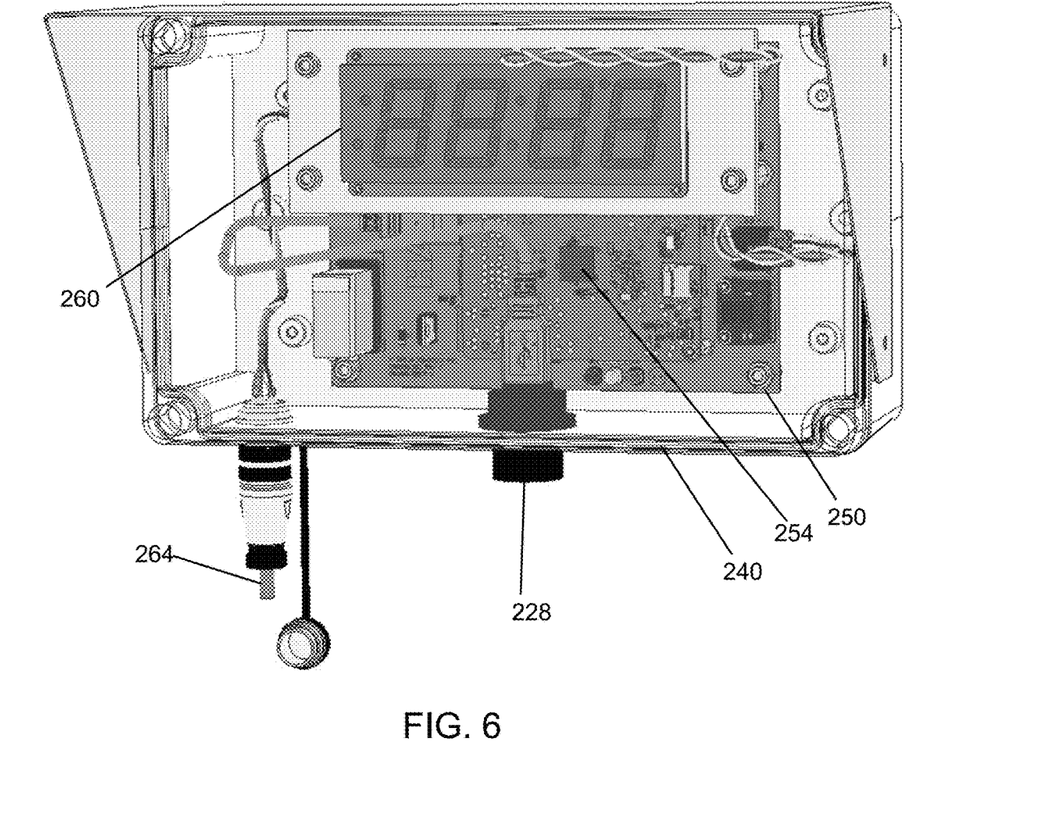

Having described the details of the fluid sensor 110, attention is also turned to FIGS. 5-6 and 7-11, which are provided to illustrate an embodiment of a pumpjack monitoring and control system, as well as the data collected from the system and processed. More specifically, a pumpjack monitoring and control system 210, such as depicted in FIGS. 5-6 may consist of or include an in-line fluid sensor 110 in a housing 170, where the sensor is operatively coupled or plumbed, for example via couplings 174, to receive the fluid output of a pumpjack 220 connected to a wellhead. In the depicted configuration, sensor 110 is used to generate and output pressure and capacitance signals in response to the fluid output, the output signals being transmitted via a wire or cable 226 to control and logging circuitry within the venturi electrical controller 240. The fluid sensor, as described above, includes a first fluid pressure sensor at the inlet to the venturi, a second fluid pressure sensor at an outlet of the venturi, and a capacitive sensor along the 2-dimensional venturi, where the capacitive sensor includes a pair of parallel conductive metal plates on each side of the 2-dimensional venturi.

The system 210 also consists of or comprises a controller 240, operating a micro-processor or similar microcontroller 254 in accordance with a set of pre-programmed instructions. The controller 240 includes a printed circuit board 250, with an I/O port that receives output from the fluid sensor 110 via the USB cable 226 connected at port 228, and processes the output signals. In addition to data retrieval the connections to other devices may enable the exchange of information other than sensor data, including programmatic upgrades and the like. In one operating mode, the controller 240 (e.g., a single board computer available from Texas Instruments company) may operate simply as a data collection device, receiving and storing the sensor output signals in memory (not shown), including converting the signals from an analog output into a digital value for storage. Also included is a pin-type plug or port (e.g., 4-pin) 264, providing wired connectivity for to the pumpjack (e.g., power and motor control signals). Wireless connectivity is also provided via a localized Bluetooth or Wi-Fi connection between the controller and a portable computing device (not shown), and also contemplated is a mobile telephony or satellite link that may be integrated into controller 240 to facilitate remote data exchange. Furthermore, a digital display 260 may be provided with controller 240, to provide status or operational information as well as real-time output of pressure or other data. Although not shown it will be appreciated that the system 210 further includes a power source, which may include one or more batteries for primary or backup power.

Figure 2:
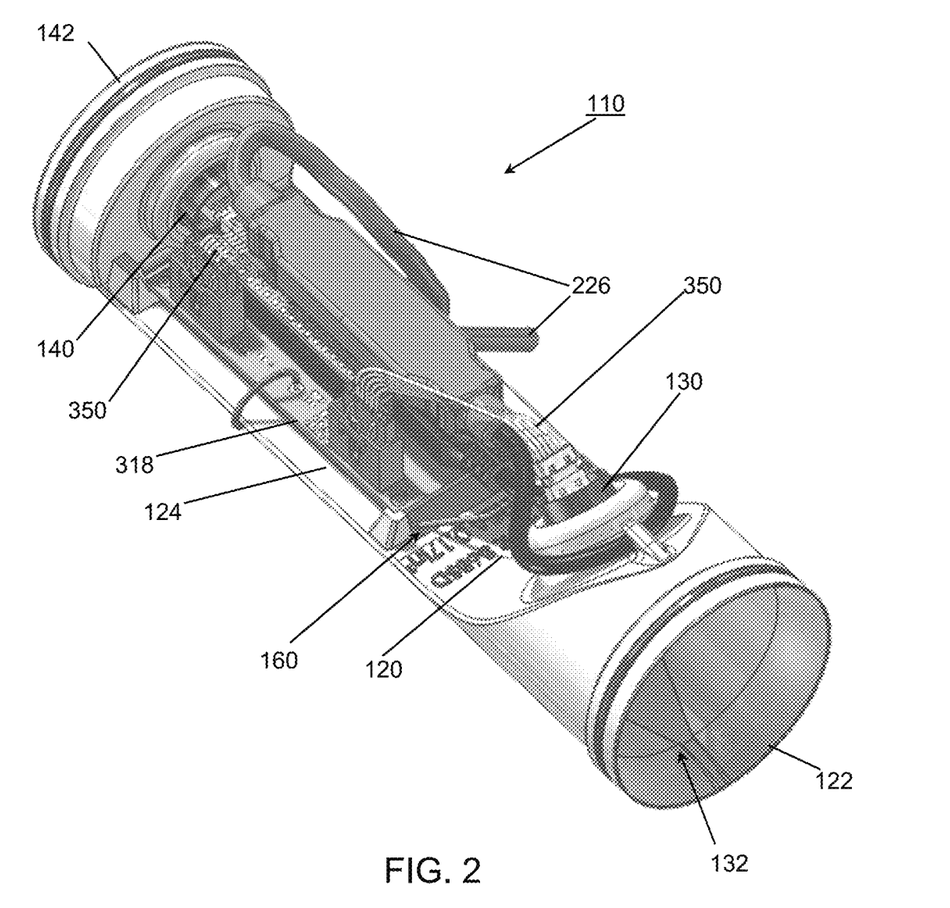
FIGS. 2 and 3 are, respectively, perspective and end views of the 2-dimensional venturi component in accordance with the disclosed embodiments.
Figure 3:
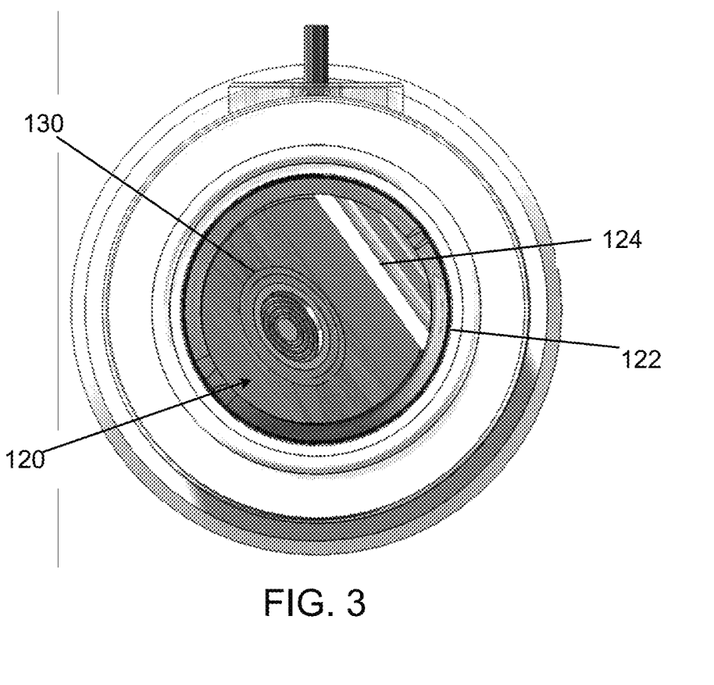
Figure 12:
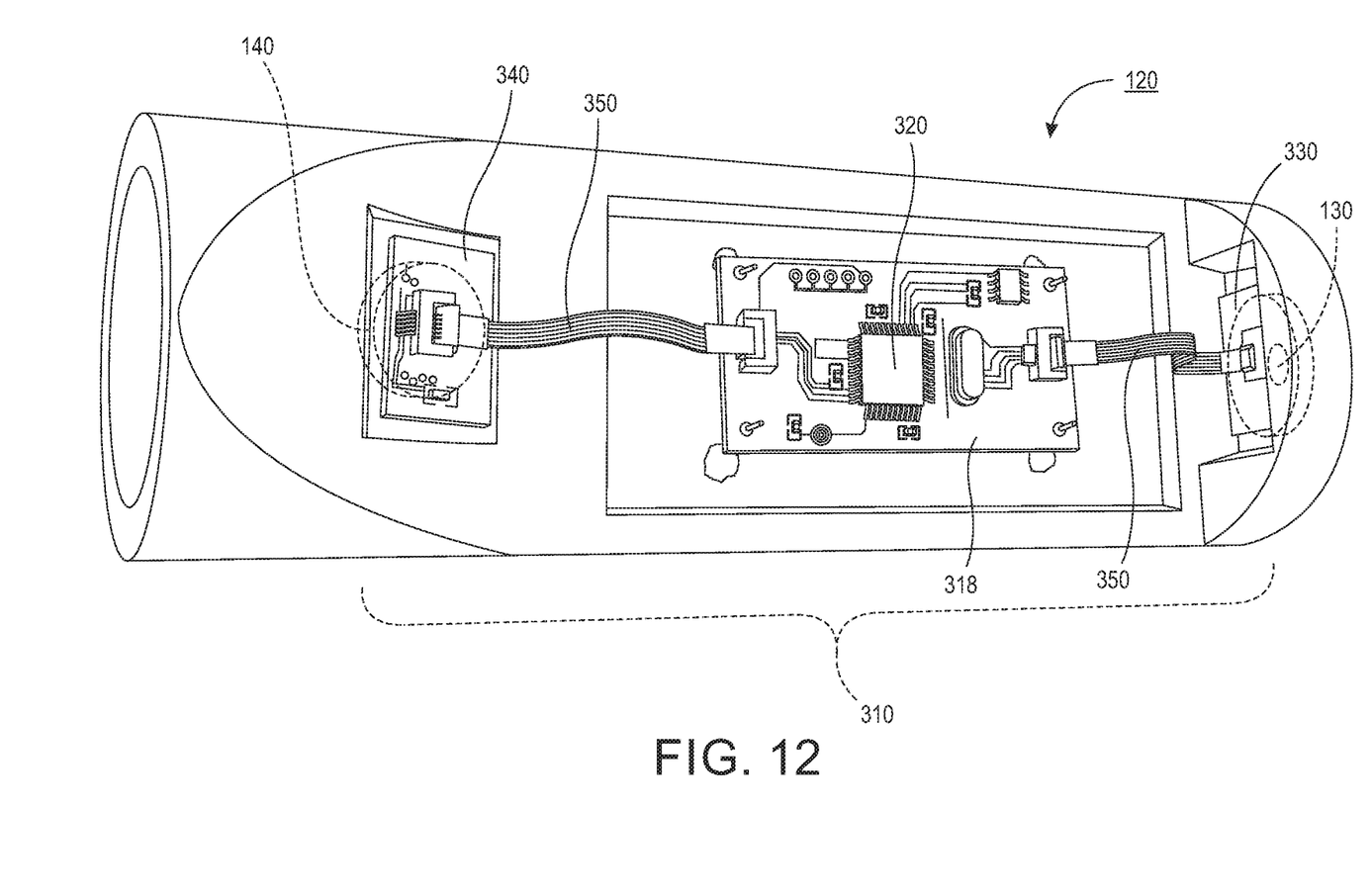
FIGS. 12-15 are illustrative examples of sensor and control circuitry with an embodiment of FIG. 1.
Figure 13:
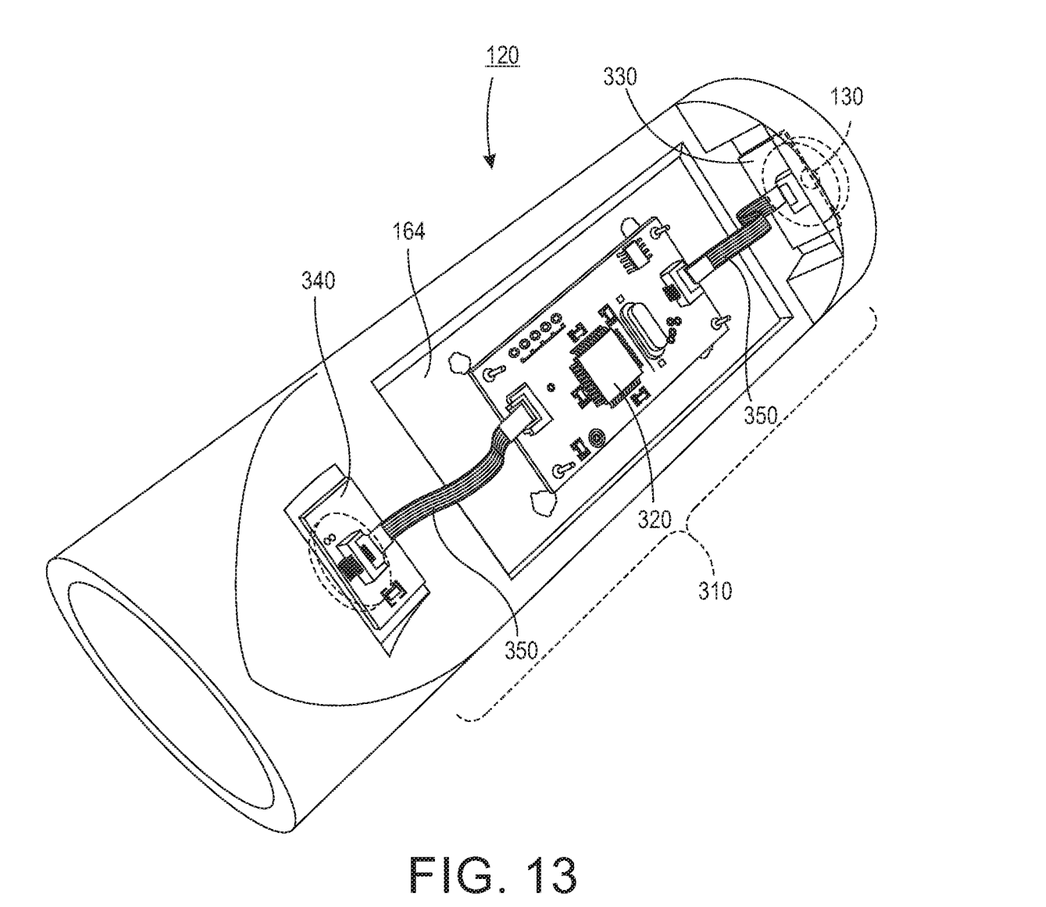
Figure 14:
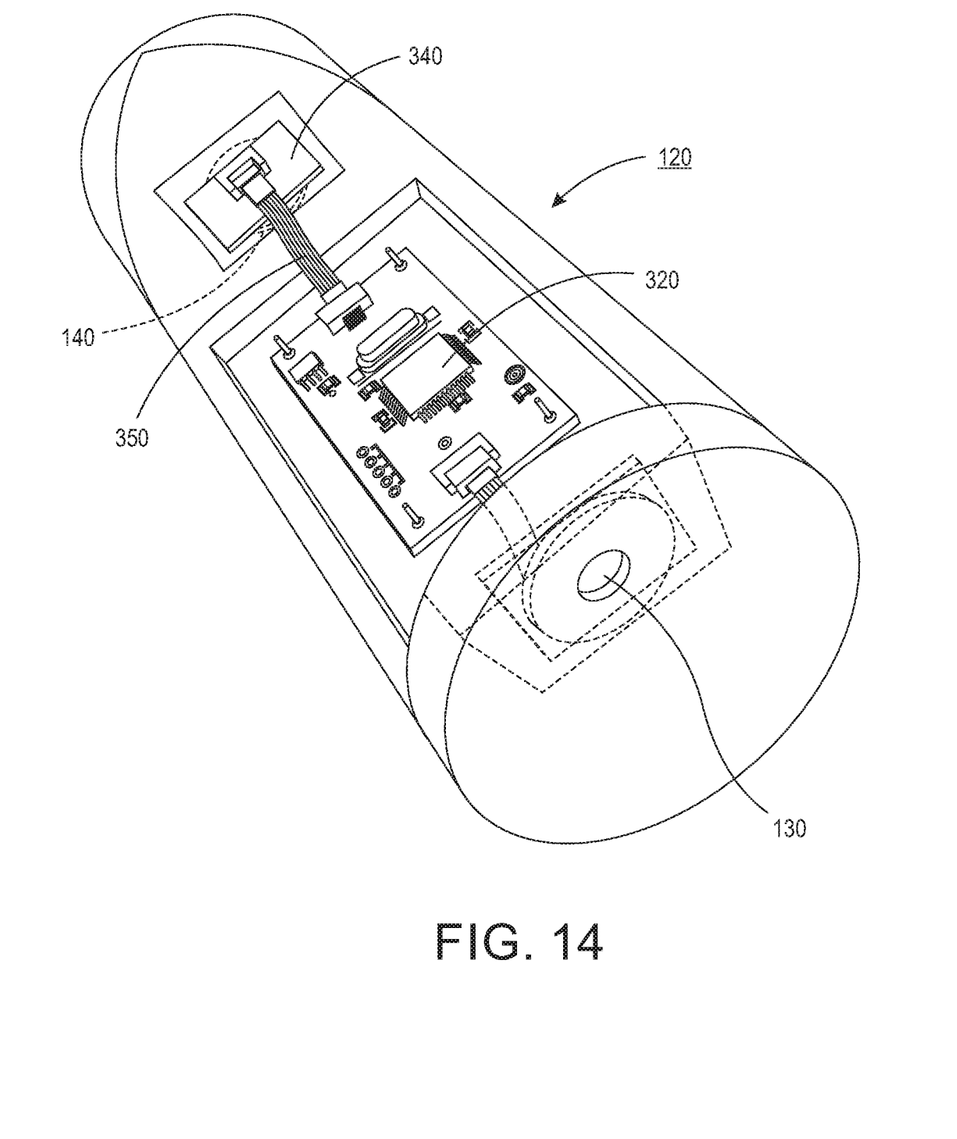
Figure 15:
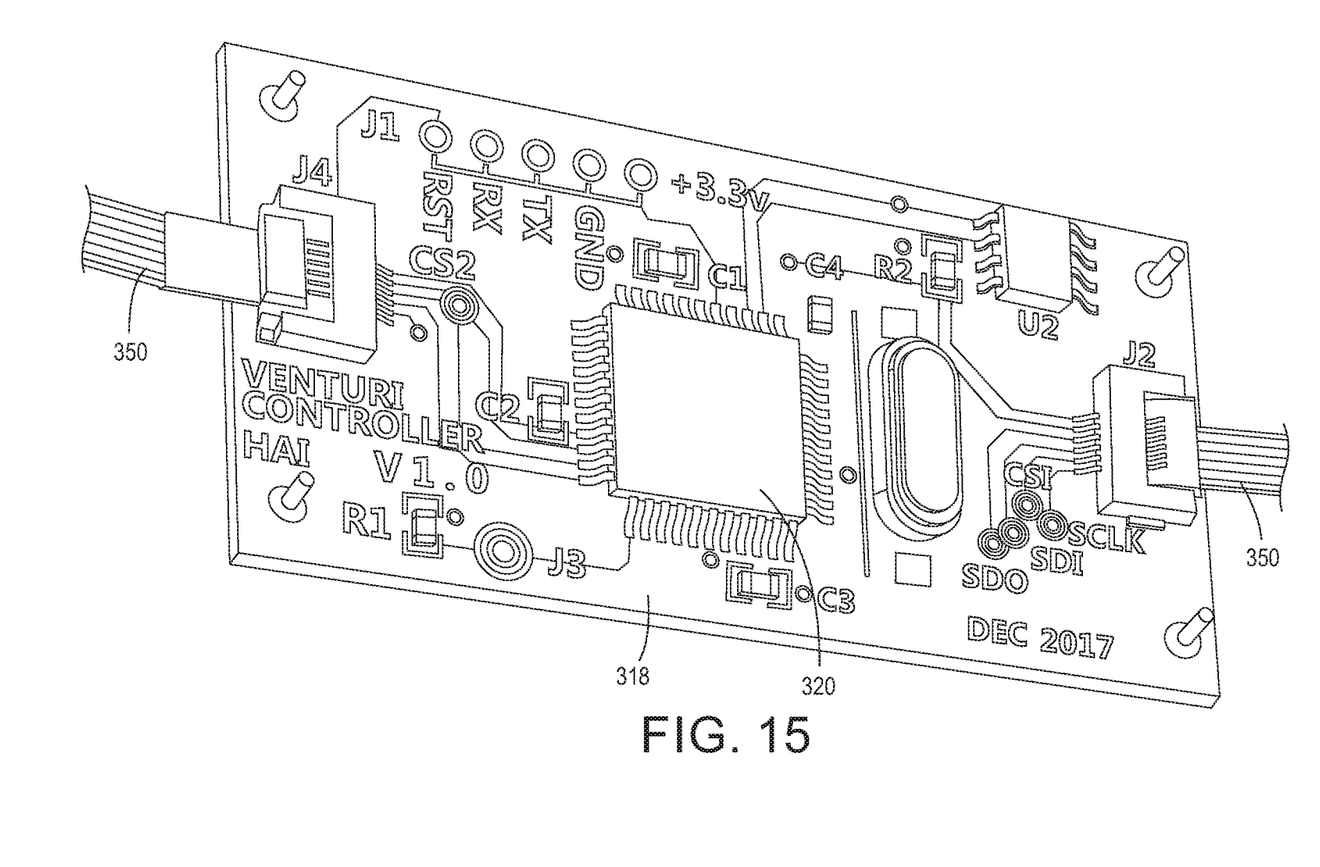

Referring briefly to FIGS. 12-15, in one embodiment the venturi sensor may include an embedded digital controller 320 with which it communicates with controller 240 via a digital UART signal (e.g., RS232). The venturi sensor system sends pre-digitized values for pressure, temperature, and capacitance to the controller. FIGS. 2 and 12-15 are representative illustrations of the venturi sensor system 120 with assembled electronics 310 attached. The electronics assembly is placed into an enclosure such as a pipe, and is then filled (potted) with epoxy. The center electronics board 318 includes the microcontroller 320, which communicates with the pressure sensors 130, 140, measures capacitance, stores and ultimately transmits a digital stream of sensor data to the controller 240. The two outer boards, 330, 340 are used for mounting the pressure sensors as depicted in FIGS. 12-14. Alternatively, as illustrated in FIG. 2, the pressure sensors 130 and 140 are directly coupled to the electronics board 318 via a wired harness or bus 350. For example, employed in one embodiment is a digital bus 350 (ribbon cable) that the microcontroller 320 uses to communicate with the pressure sensors. The embedded digital controller 320 is primarily employed to convert the analog sensor signals to digital signals in order to mitigate noise that is usually associated with a transmitted analog signal (especially when measuring capacitance). Lastly, the ability to sense temperature of the fluid flowing through the sensor allows for a more accurate characterization of the fluid pressures.

In another embodiment, the controller, or another computer processor (not shown) to which the controller 240 is linked (wired (e.g., port 264) or wirelessly), may use the output signals to monitor the pumpjack output and, based upon such signals, analyze and report the performance of the pumpjack as, for example, depicted in FIGS. 7-11. Moreover, the controller or other computer may process the output signals to totalize the amount of oil and/or water pumped from the wellhead over a period of time based upon the differential pressure data between the first and second pressure sensors. As noted above, the pumpjack monitoring and control system may include a wireless transceiver for communicating data with another computerized device.

The pumpjack monitoring and control system 210 may also process the data from the sensor 110 and modify the operation of the pumpjack to optimize extraction of oil from the wellhead. For example, the system may be employed to determine, based upon real-time output signals from sensor 110, whether oil, water or gas are being pumped and passed through the sensor. And, based upon such a determination, the pumpjack operation may be continued, stopped or otherwise adjusted accordingly. As an example, upon detecting the pumping of oil, the operation of the pumpjack is continued whereas upon the detection of water or gas the operation of the pumpjack may be stopped or modified. In one embodiment, the system determines or distinguishes the type of fluid in the sensor based upon the pressure and capacitance signals being generated by the sensor. For example, the system may employ one or more of the following rules:

a) oil=high stroke pressure in combination with low capacitance;

b) water=high stroke pressure in combination with high capacitance; and/or c) gas=low stroke pressure in combination with low/oscillating capacitance.

Figure 7:
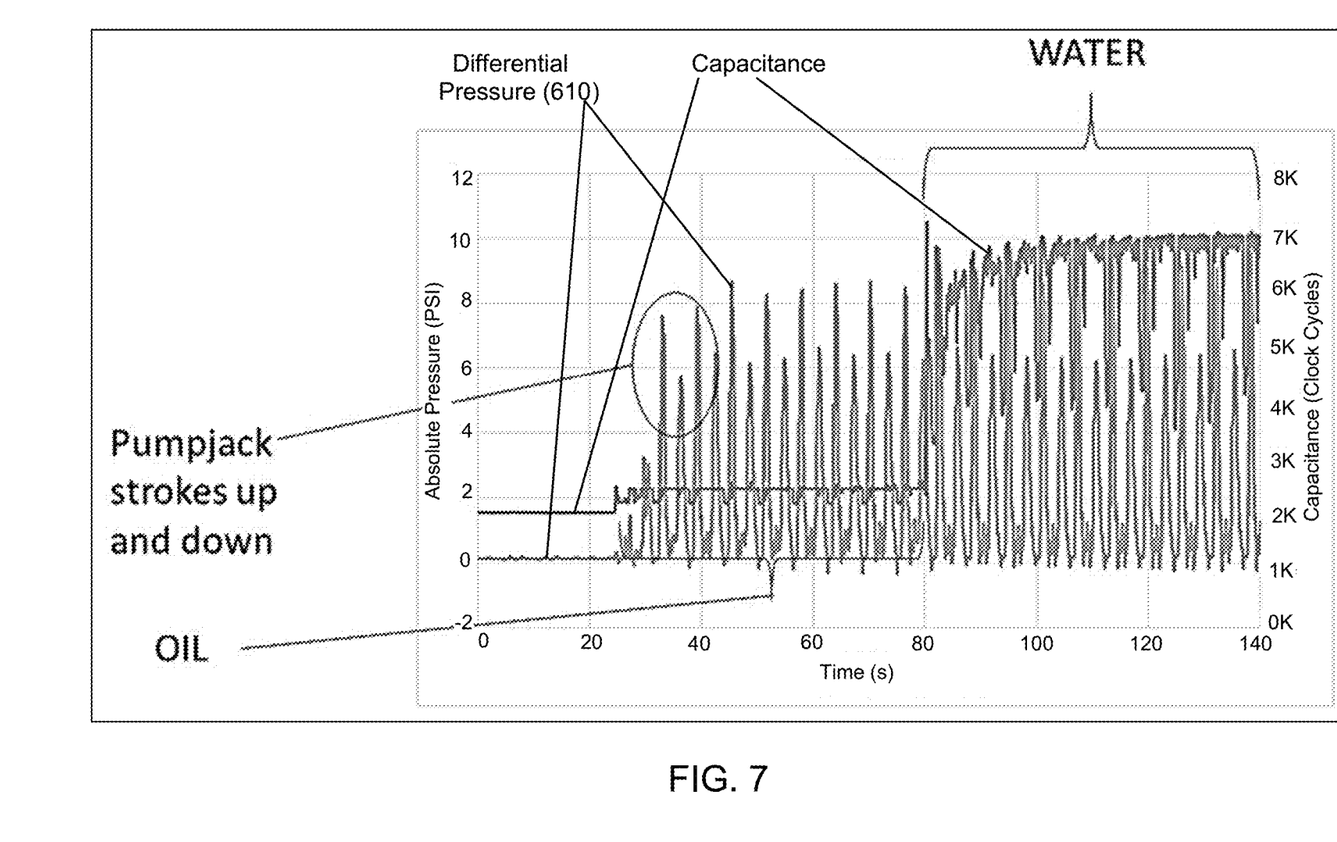
FIGS. 7-11 are illustrative graphs of exemplary pressure and capacitance data generated by the disclosed sensor and control system.

As illustrated in FIG. 7, for example, each stroke of the pumpjack creates a pressure "spike" in the differential pressure (610) between the input and output sensors (130 and 140, respectively). And, when the fluid transitions from oil to water, at approximately 80 seconds in the chart of FIG. 7, the change in the pressure profile (slight decrease in peak pressure due to water) is concurrent with a similar increase in the measured capacitance (also consistent with water instead of oil being present in the 2D-venturi).

Figure 8:
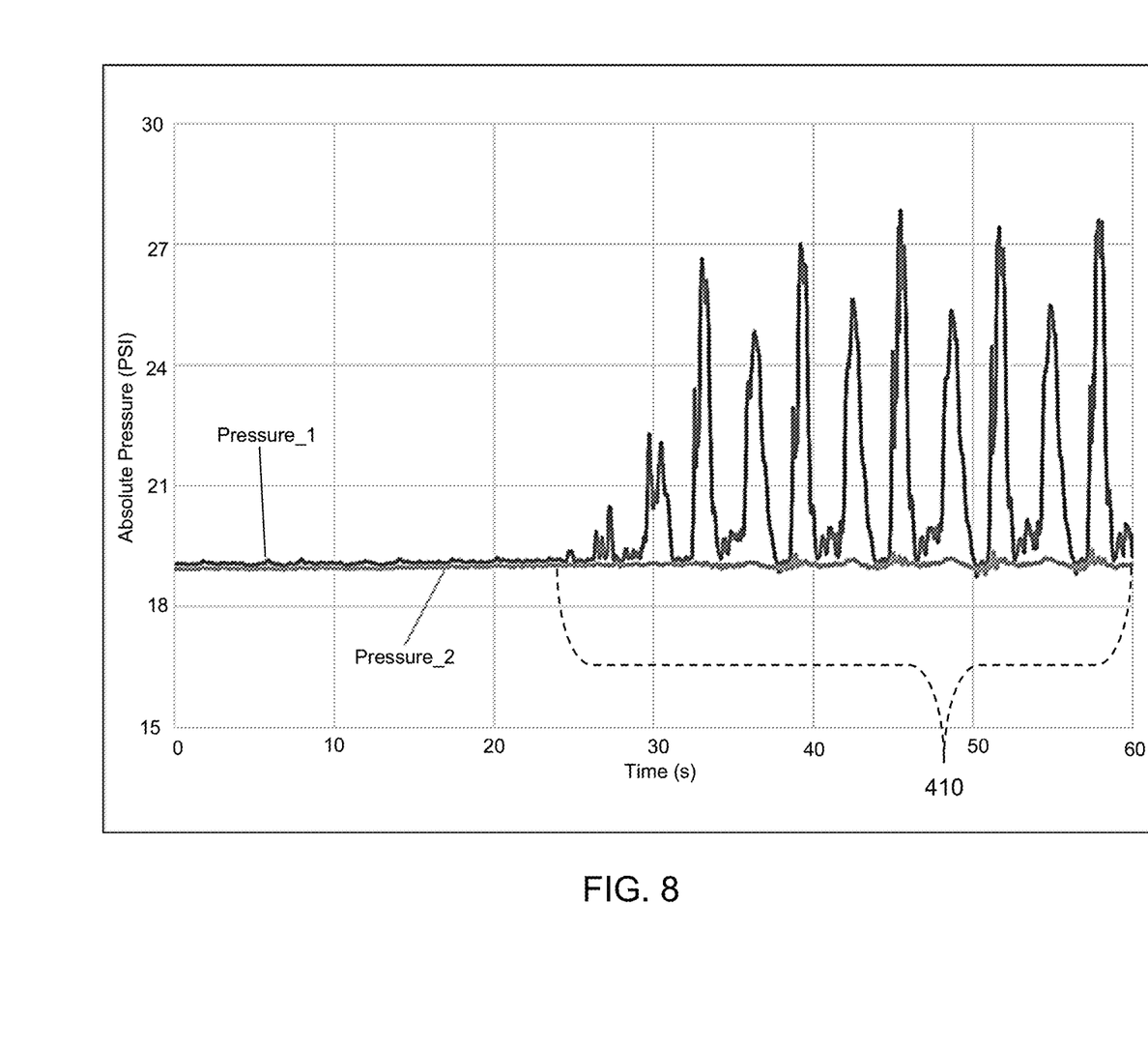
Figure 9:
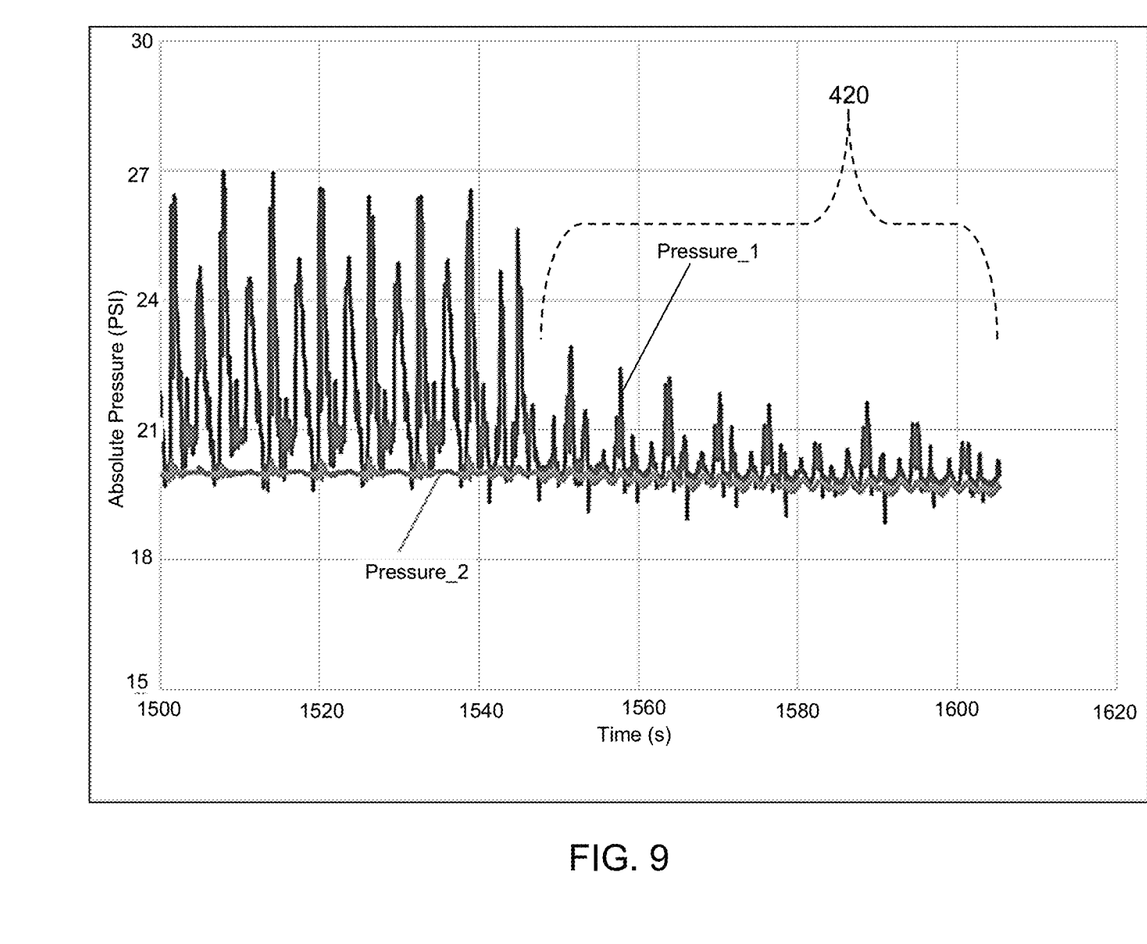

As illustrated in FIG. 8, the observed differential (or absolute) pressure initially increases (e.g., pressure buildup region 410) above a nominal level when the pumpjack starts and begins to pump fluid through the sensor. And when the accumulated fluid in the well has been pumped off (e.g., well pumped-off region 420), the pressure decreases back to near the nominal pressure level as shown in FIG. 9.

Figure 10:
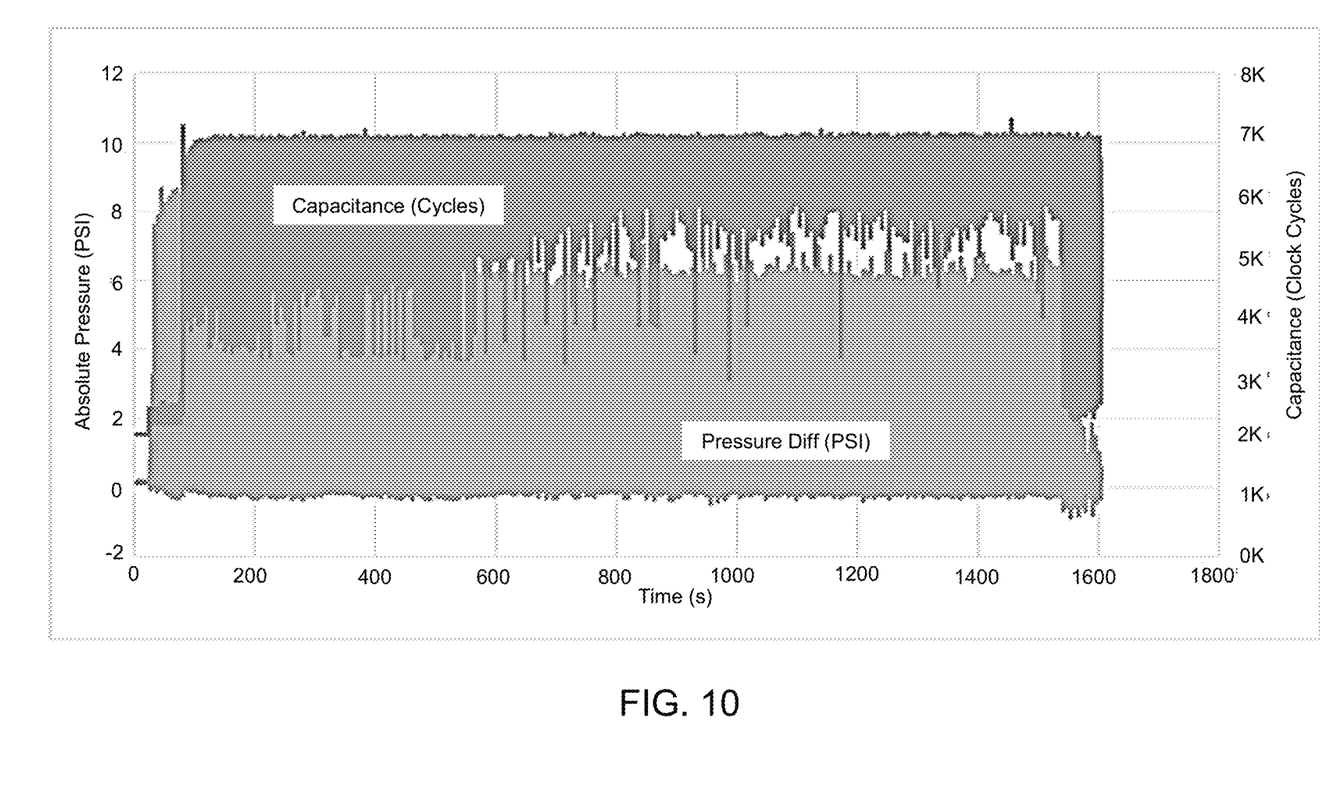
Figure 11:
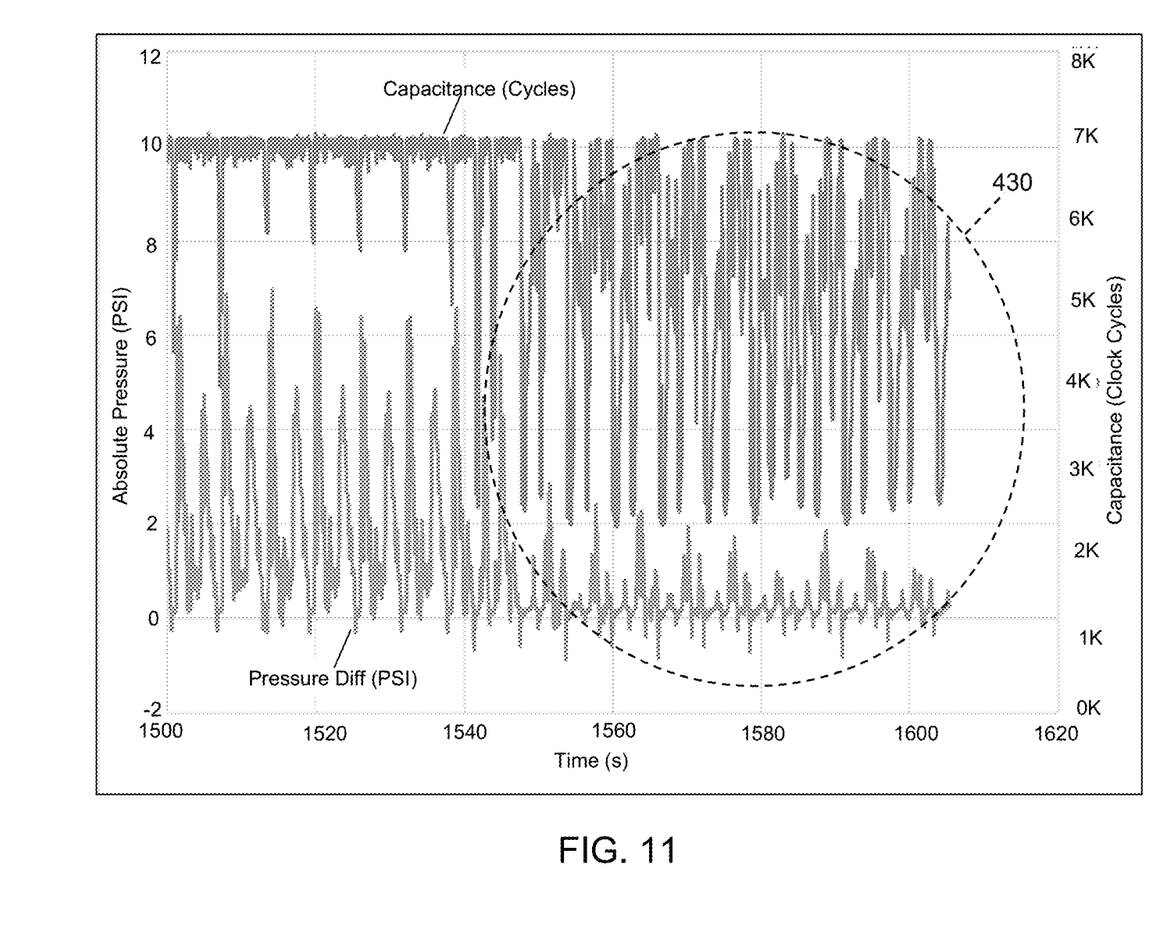

FIG. 10 is provided to illustrate how the controller records a time-series for the entire pumping cycle. Collection of the data allows for post processing to calculate the volume/ water cut data, which can then be employed to facilitate greater accuracy of measurements. Any time fluid is pumped from a well it is expected that the fluid may be a combination of oil and water. Typically, "water cut" is the ratio or percentage of oil/water that was pumped. For example, for the well tested (see e.g., FIG. 10), upwards of 95-percent of the fluid being pumped may be water. Thus, the water cut would be characterized as 95-percent. The availability and analysis of data collected across entire pumping cycles facilitates the use of "learning", including comparison against prior data and pattern detection within the data, to facilitate adjustment of control parameters based upon past performance data for the pumpjack/well. And, as suggested above and in FIG. 11, the data from the sensor might also be used to allow the system to detect the presence of gas or foam within the fluid pumped from the well and passed through the sensor. For example, region 430 of the graph shows a combination of low pressure plus low/oscillating capacitance that may indicate the presence of foaming or gas.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A fluid sensor comprising:
   a 2-dimensional venturi producing a controlled thickness of non-stratified fluid flow therethrough;
   a first fluid sensor located on an inlet to the venturi to measure at least an input fluid pressure;
   a second fluid sensor located on an outlet of the venturi to measure at least an output fluid pressure, wherein a fluid flow rate is determined as a function of the input fluid pressure and output fluid pressure;
   a capacitive sensor located adjacent the 2-dimensional venturi, the capacitive sensor including a pair of parallel conductive plates located on each side of the 2-dimensional venturi for detecting a dielectric strength of the fluid flowing through the venturi.

2. The fluid sensor according to claim 1 where said sensor is a complete unit that is operatively coupled to a pumpjack well piping system.

3. The fluid sensor according to claim 2 where said fluid sensor is coupled to said piping system with standard plumbing fittings.

4. The fluid sensor according to claim 1, further including a pumpjack connected to a wellhead, wherein said fluid sensor is operatively coupled to an output of the pumpjack, and fluid fully drains out of the sensor after the pumpjack is shut down.

5. The fluid sensor according to claim 1, wherein at least one of said first and second fluid sensors also senses fluid temperature.

6. The fluid sensor according to claim 5, further including a controller, operating in accordance with a set of preprogrammed instructions, said controller processing the pressure and capacitance signals to monitor the performance of the pumpjack, including totalizing at least an amount of oil pumped from the wellhead.

7. The fluid sensor according to claim 1, further including a pumpjack connected to a wellhead, wherein said fluid sensor is operatively coupled to an output of the pumpjack, and generates at least pressure and capacitance signals in response to the fluid output by the pumpjack.

8. A pumpjack monitoring and control system for a well, including:
- an in-line fluid sensor, including a 2-dimensional venturi producing a controlled thickness of non-stratified fluid flow therethrough, operatively coupled to receive the fluid output of a pumpjack connected to a wellhead of the well, and to generate at least pressure and capacitance signals in response to the fluid output, said fluid sensor comprising:
  - a) a first fluid pressure sensor located on an inlet to the 2-dimensional venturi;
  - b) a second fluid pressure sensor located on an outlet of the 2-dimensional venturi;
  - c) a capacitive sensor located adjacent the 2-dimensional venturi, the capacitive sensor including a pair of parallel conductive metal plates located on each side of the 2-dimensional venturi; and
- a controller, operating in accordance with a set of pre-programmed instructions, said controller receiving output from said fluid sensor, said controller processing the output and using said output to monitor the pumpjack output and to report the performance of the pumpjack, and totalize the amount of liquid pumped from the wellhead.

9. The pumpjack monitoring and control system according to claim 8, wherein the controller further characterizes, based upon the output of the capacitive sensor, an amount of oil and an amount of water pumped from the wellhead.

10. The pumpjack monitoring and control system according to claim 8, further including a wireless transceiver for communicating data with another computerized device.

11. The pumpjack monitoring and control system according to claim 10, wherein said controller further processes the data and modifies the operation of the pumpjack to optimize the extraction of oil from the wellhead.

12. The pumpjack monitoring and control system according to claim 11 wherein upon detecting the pumping of oil, the operation of the pumpjack is continued whereas upon the detection of water or gas the operation of the pumpjack may be modified.

13. The pumpjack monitoring and control system according to claim 8, where the system determines the type of fluid in the sensor in accordance with rules consisting of:
  - a) oil=high stroke pressure in combination with low capacitance;
  - b) water=high stroke pressure in combination with high capacitance; and
  - c) gas=low stroke pressure in combination with low/oscillating capacitance.

14. The pumpjack monitoring and control system according to claim 13, where the system determines that the well has been pumped off based upon a decrease in pumpjack fluid pressure.

* * * * *